United States Patent
Pancorbo Marcos et al.

(10) Patent No.: US 10,455,382 B2
(45) Date of Patent: Oct. 22, 2019

(54) APPARATUSES AND METHODS FOR MULTIPLE PRESENCE REPORTING AREAS

(71) Applicant: Telefonaktiebolaget LM Ericsson (publ), Stockholm (SE)

(72) Inventors: Maria Belen Pancorbo Marcos, Madrid (ES); Roland Gustafsson, Bengtsfors (SE); Josefin Karlsson, Torslanda (SE); Åsa Larsen, Hisings Backa (SE); Irene Martin Cabello, Madrid (ES); Ulf Mattsson, Kungsbacka (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/775,058

(22) PCT Filed: Nov. 8, 2016

(86) PCT No.: PCT/EP2016/076966
§ 371 (c)(1),
(2) Date: May 10, 2018

(87) PCT Pub. No.: WO2017/080997
PCT Pub. Date: May 18, 2017

(65) Prior Publication Data
US 2018/0376302 A1 Dec. 27, 2018

Related U.S. Application Data

(60) Provisional application No. 62/253,924, filed on Nov. 11, 2015.

(51) Int. Cl.
*H04W 24/00* (2009.01)
*H04W 4/24* (2018.01)
(Continued)

(52) U.S. Cl.
CPC ............... *H04W 4/24* (2013.01); *H04L 12/14* (2013.01); *H04L 12/1407* (2013.01);
(Continued)

(58) Field of Classification Search
CPC ............................... H04W 4/24; H04M 15/66
(Continued)

(56) References Cited

U.S. PATENT DOCUMENTS

2015/0365789 A1* 12/2015 Salot ....................... H04W 4/02
455/456.1

OTHER PUBLICATIONS

3GPP TS 23.401 v13.4.0; Technical Specification; 3rd Generation Partnership Project; Technical Specification Group Services and System Aspects; General Packet Radio Service (GPRS) enhancements for Evolved Universal Terrestrial Radio Access Network (E-UTRAN) access (Release 13)—Sep. 2015.
(Continued)

*Primary Examiner* — Huy C Ho
(74) *Attorney, Agent, or Firm* — Baker Botts, LLP

(57) ABSTRACT

Handling a plurality of Presence Reporting Areas, PRAs, may currently present inconsistencies between the PRAs active in a policy controller and those PRAs active in a network node handling UE mobility, e.g. MME/SGSN. To overcome these and other drawbacks, there are provided enhanced policy controller, network node and method of handling a plurality of PRAs. This method comprises selecting, at the policy controller, a plurality of applicable PRAs; transmitting from the policy controller, and receiving at the network node, the plurality of applicable PRAs; selecting, at the network node from the plurality of applicable PRAs, a number of PRAs to be active at the network node; and transmitting from the network node, and receiving at the policy controller, at least one of: an indication on whether a
(Continued)

UE is inside or outside a PRA, and an indication on whether a PRA is or is not accepted to be active by the network node.

20 Claims, 13 Drawing Sheets

(51) Int. Cl.
  *H04W 4/021* (2018.01)
  *H04L 12/14* (2006.01)
  *H04M 15/00* (2006.01)
(52) U.S. Cl.
  CPC .......... *H04M 15/00* (2013.01); *H04M 15/66* (2013.01); *H04M 15/8033* (2013.01); *H04M 15/8038* (2013.01); *H04W 4/021* (2013.01)
(58) Field of Classification Search
  USPC ...................................... 455/456.3
  See application file for complete search history.

(56) References Cited

OTHER PUBLICATIONS

SA WG2 Meeting #112; Anaheim, USA; Title: Solution to support multiple PRAs in EPS in a dynamic manner using User Location Reporting procedure; Source: Intel, China Unicom (S2-153879)—Nov. 16-20, 2015.
3GPP TSG-SA2 Meeting #112; Anaheim, USA; Title: Alternative Solutions for Multiple Areas Change Reporting; Source: Huawei, Hisilicon (S2-153910)—Nov. 16-20, 2015.
PCT International Search Report for International application No. PCT/EP2016/076966—Jan. 10, 2017.
PCT Written Opinion of the International Searching Authority for International application No. PCT/EP2016/076966—Jan. 10, 2017.

* cited by examiner

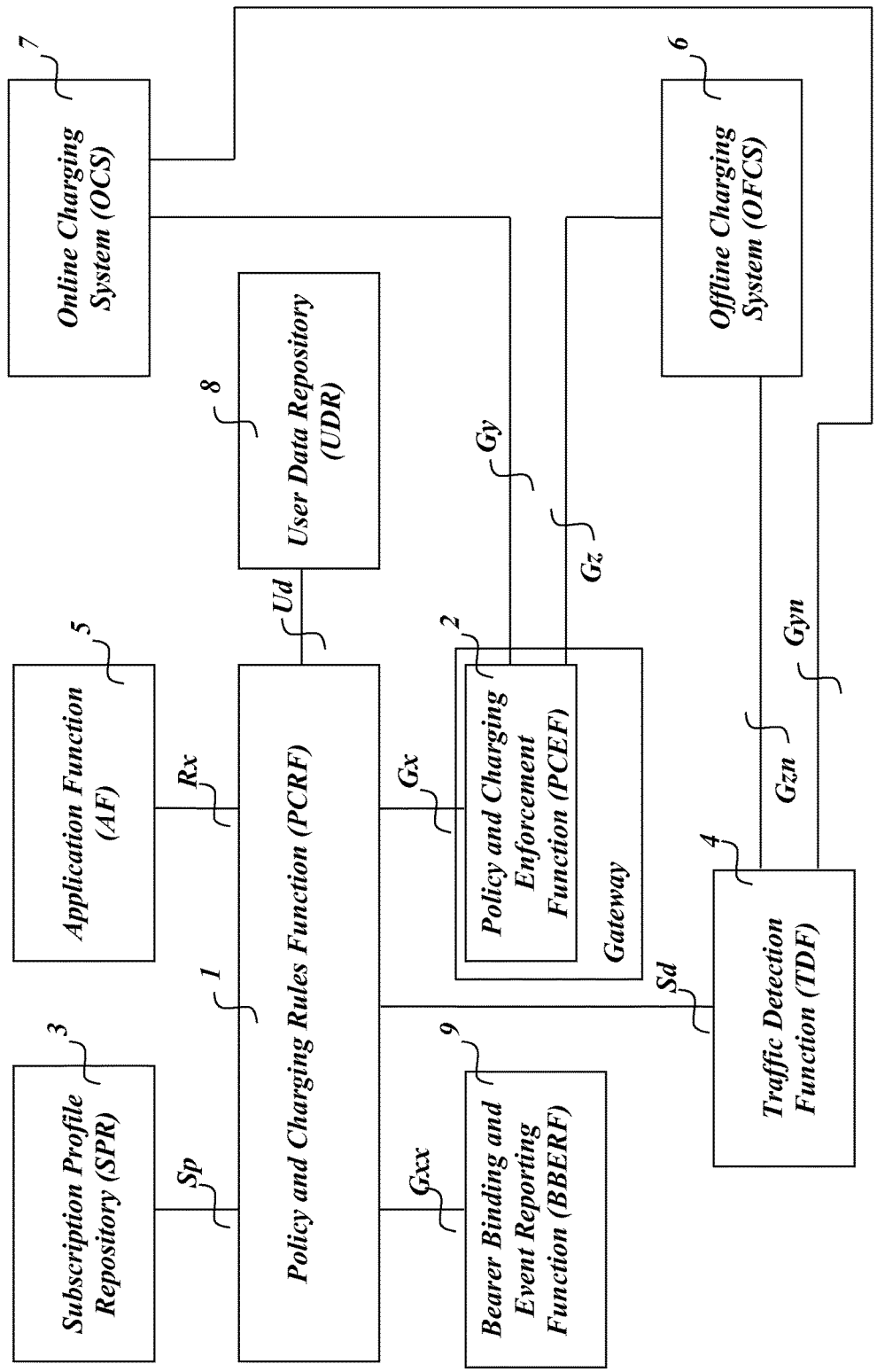
FIG. -1-

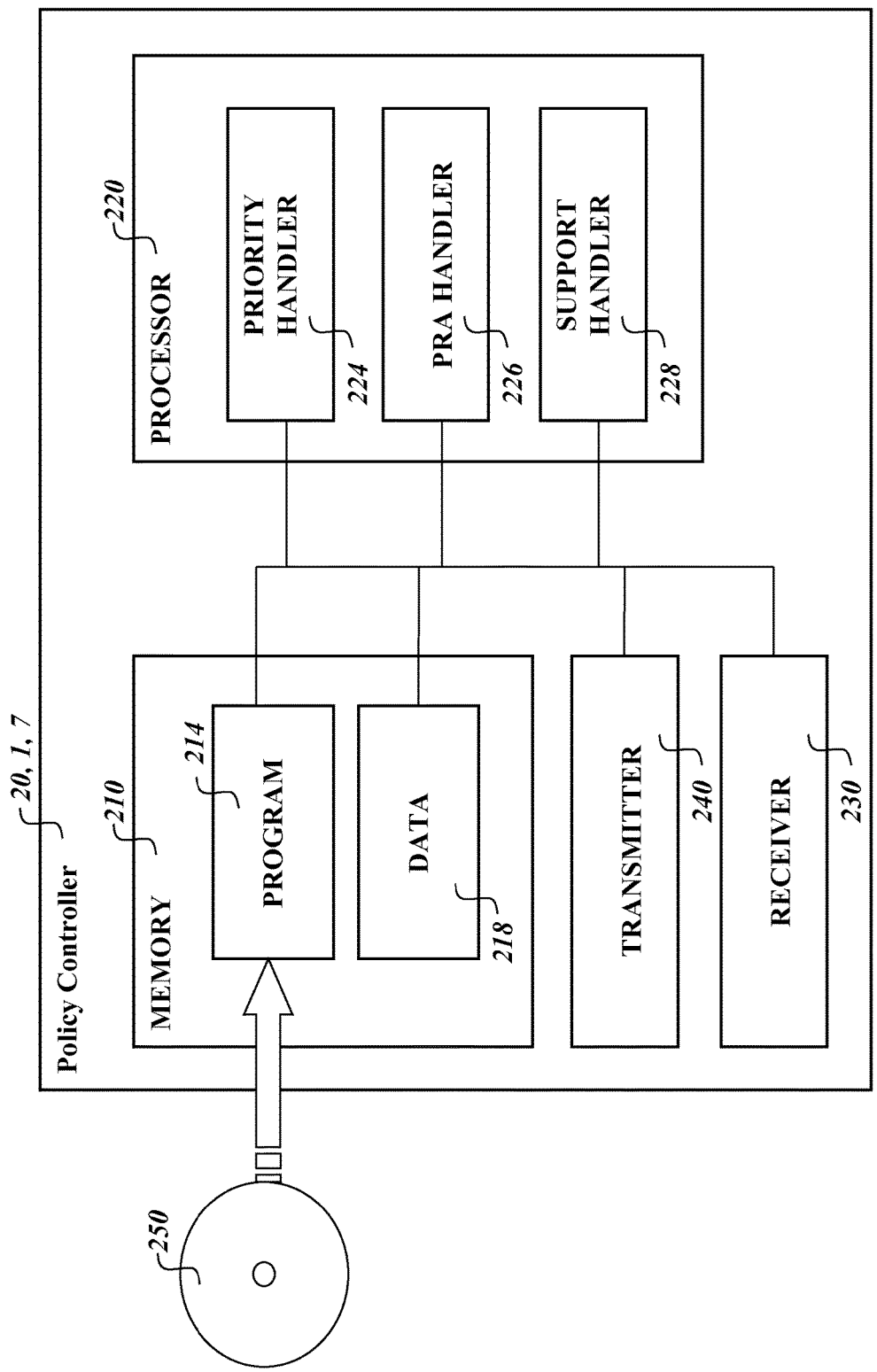

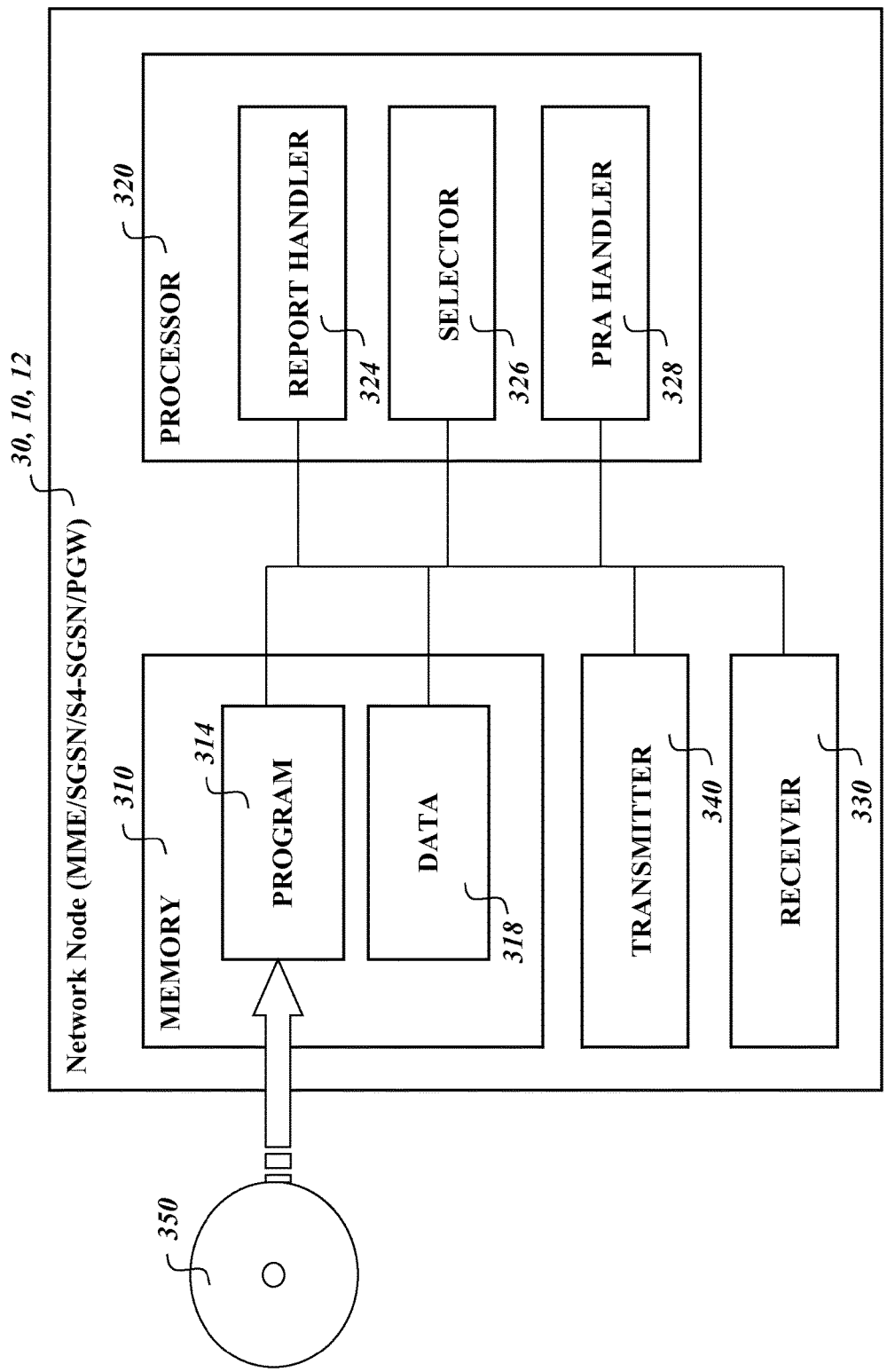
FIG. -3-

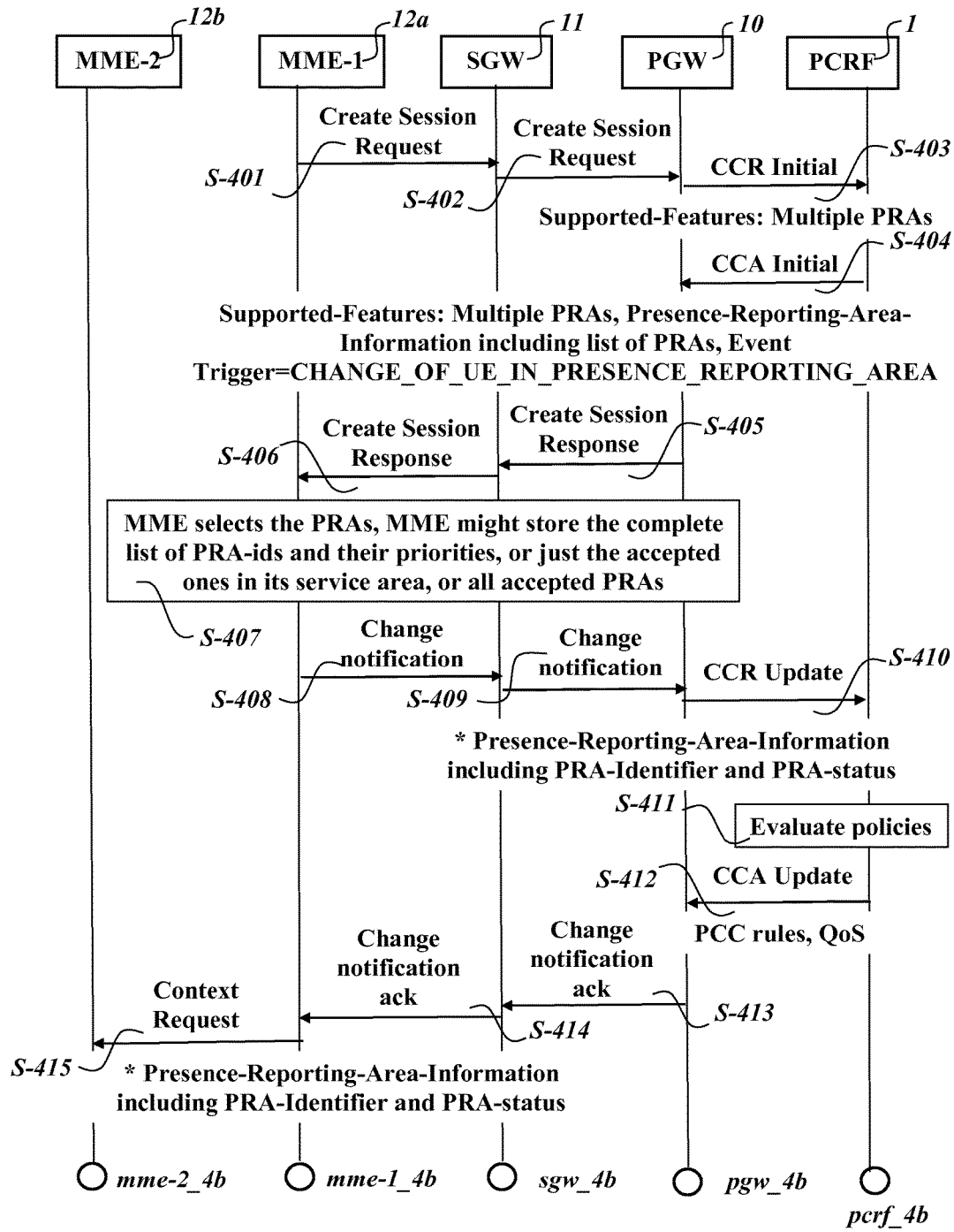
FIG.-4a-

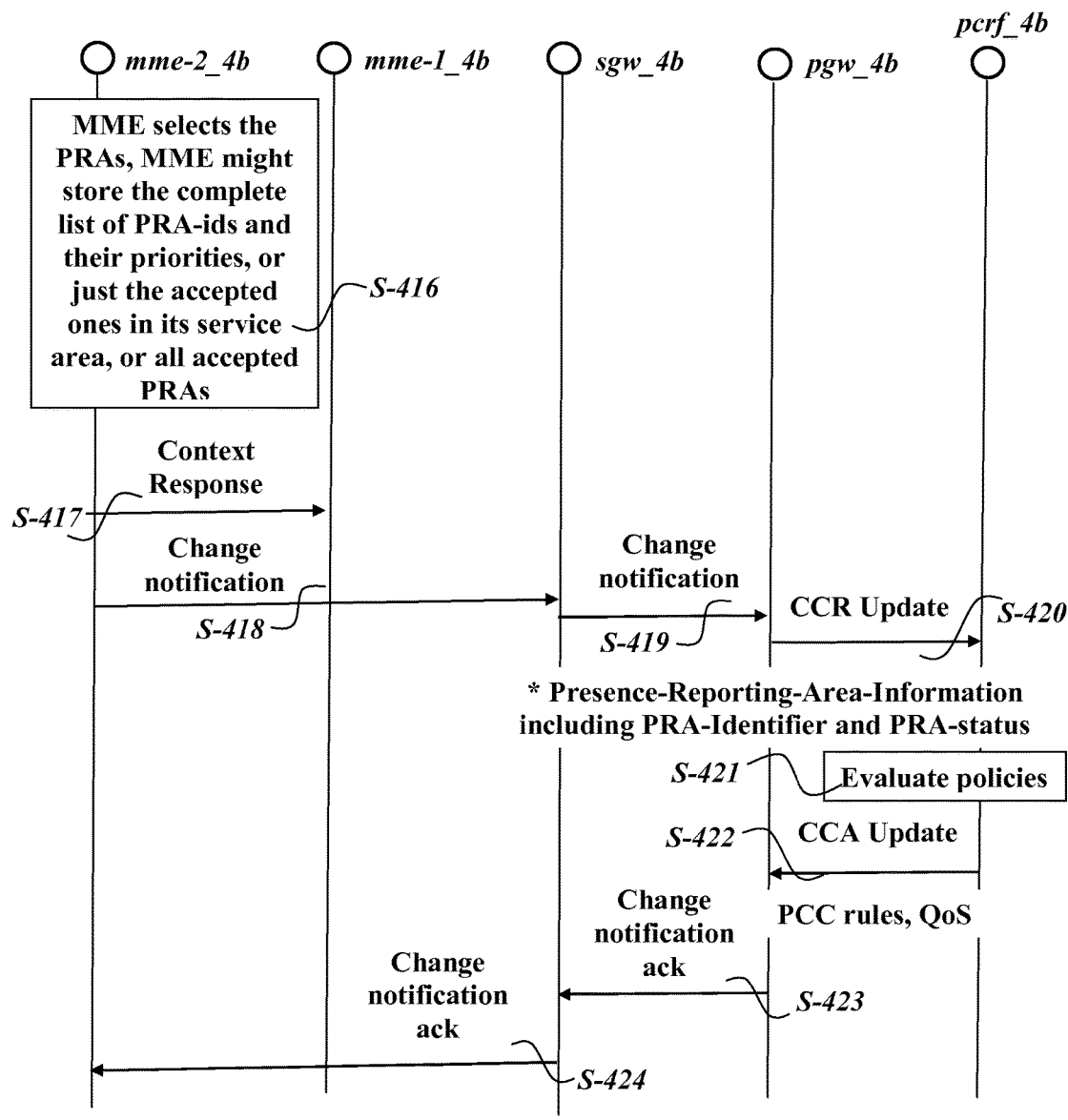
FIG.-4b-

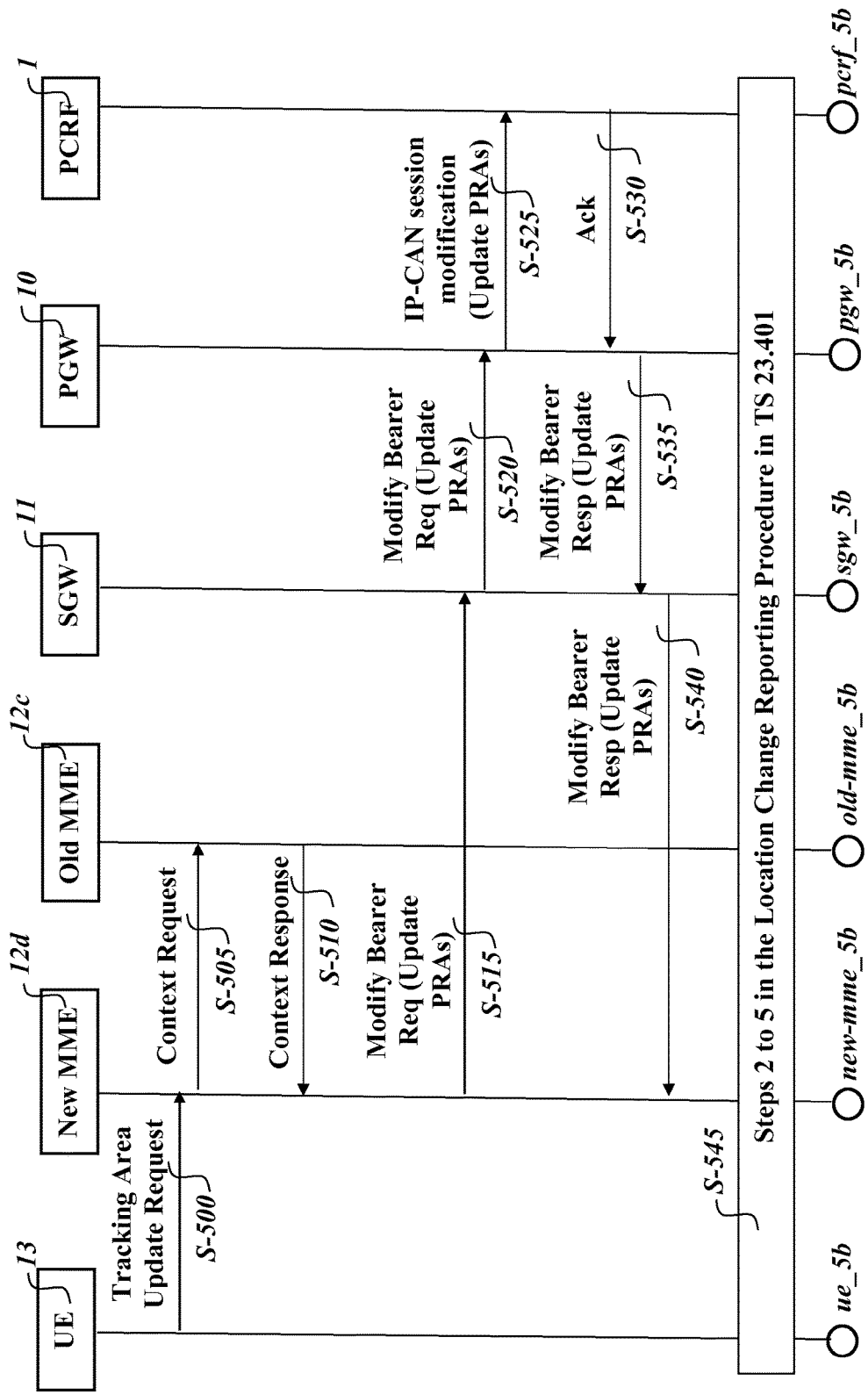
FIG.-5a-

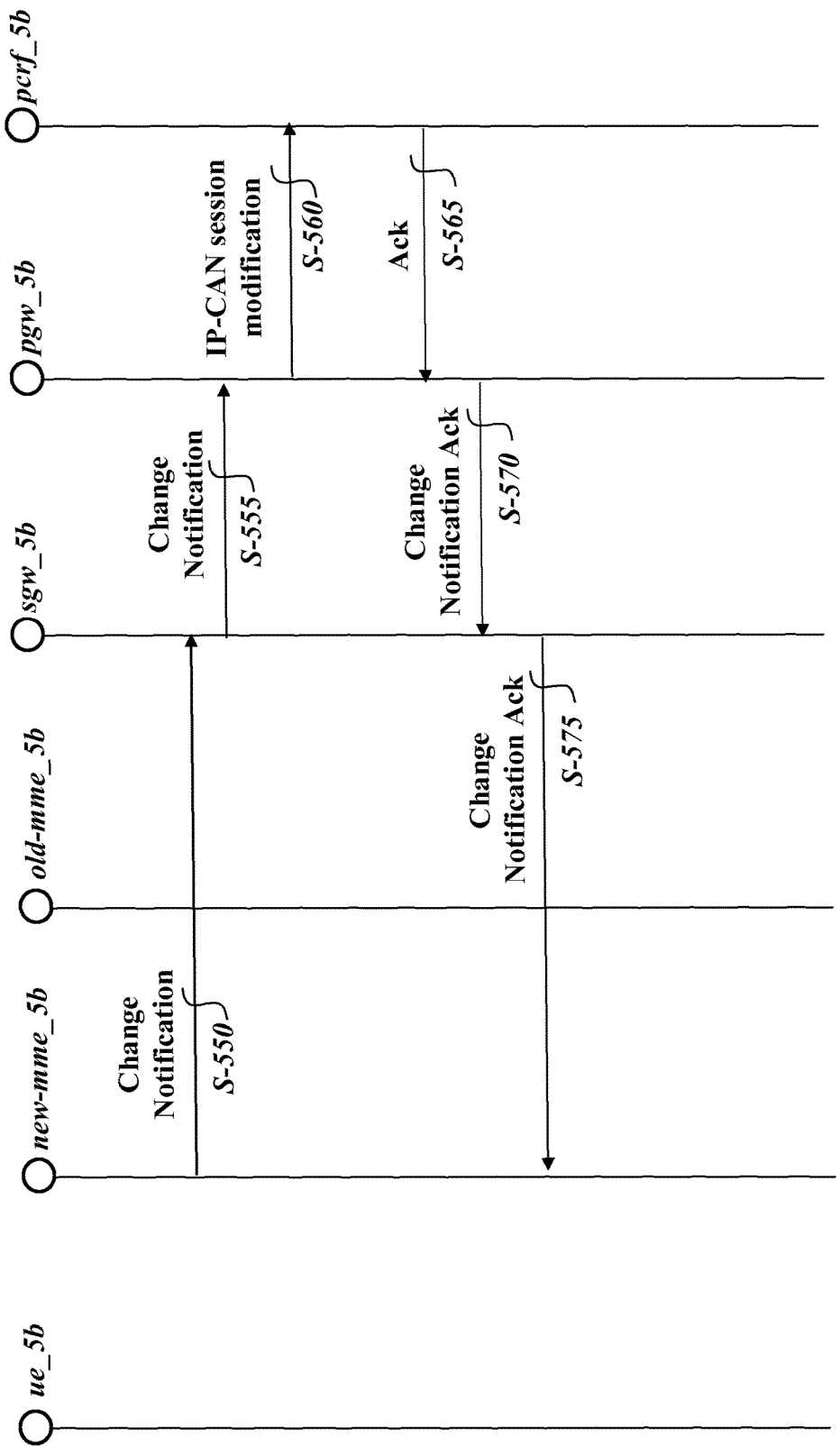
FIG. -5b-

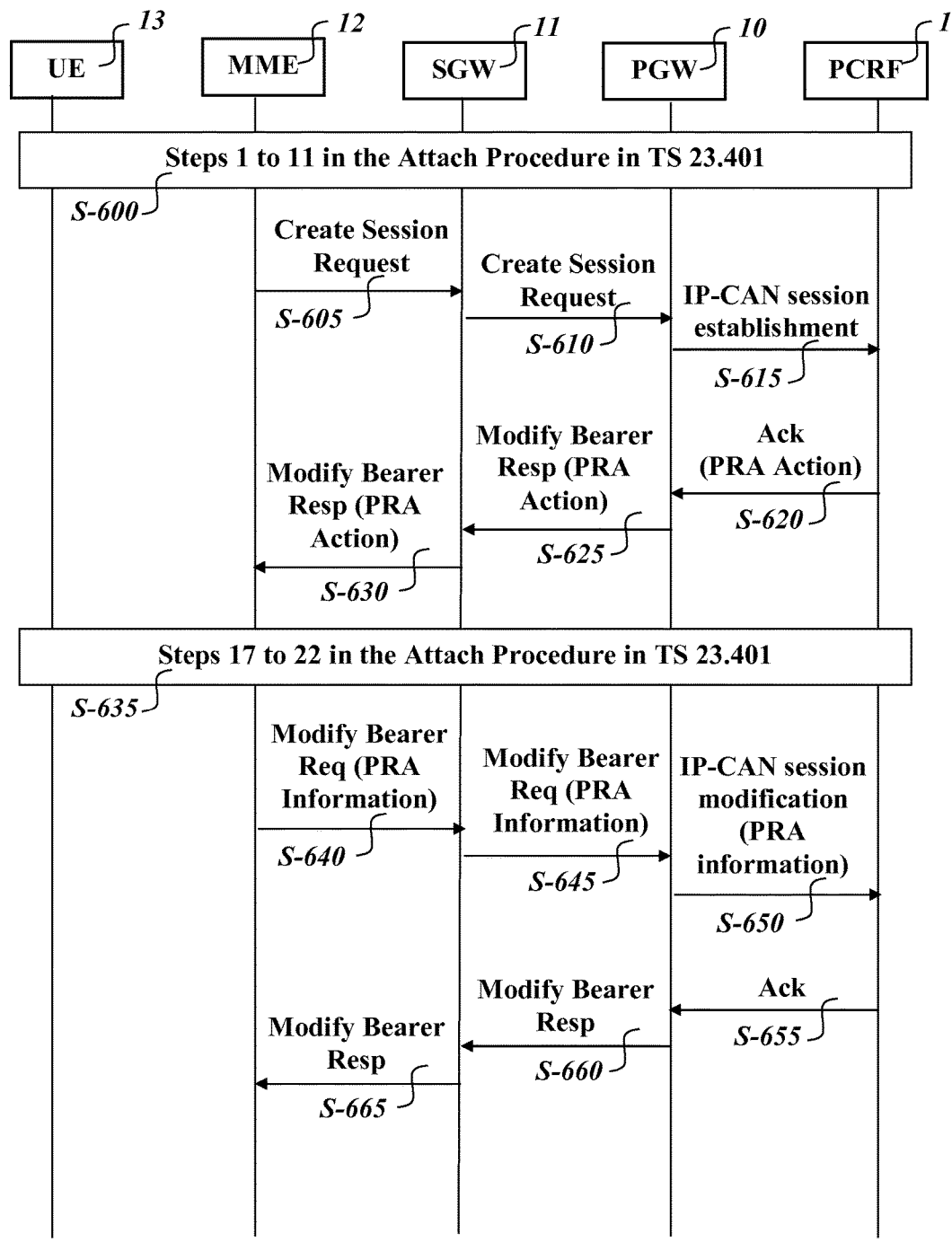
FIG.-6-

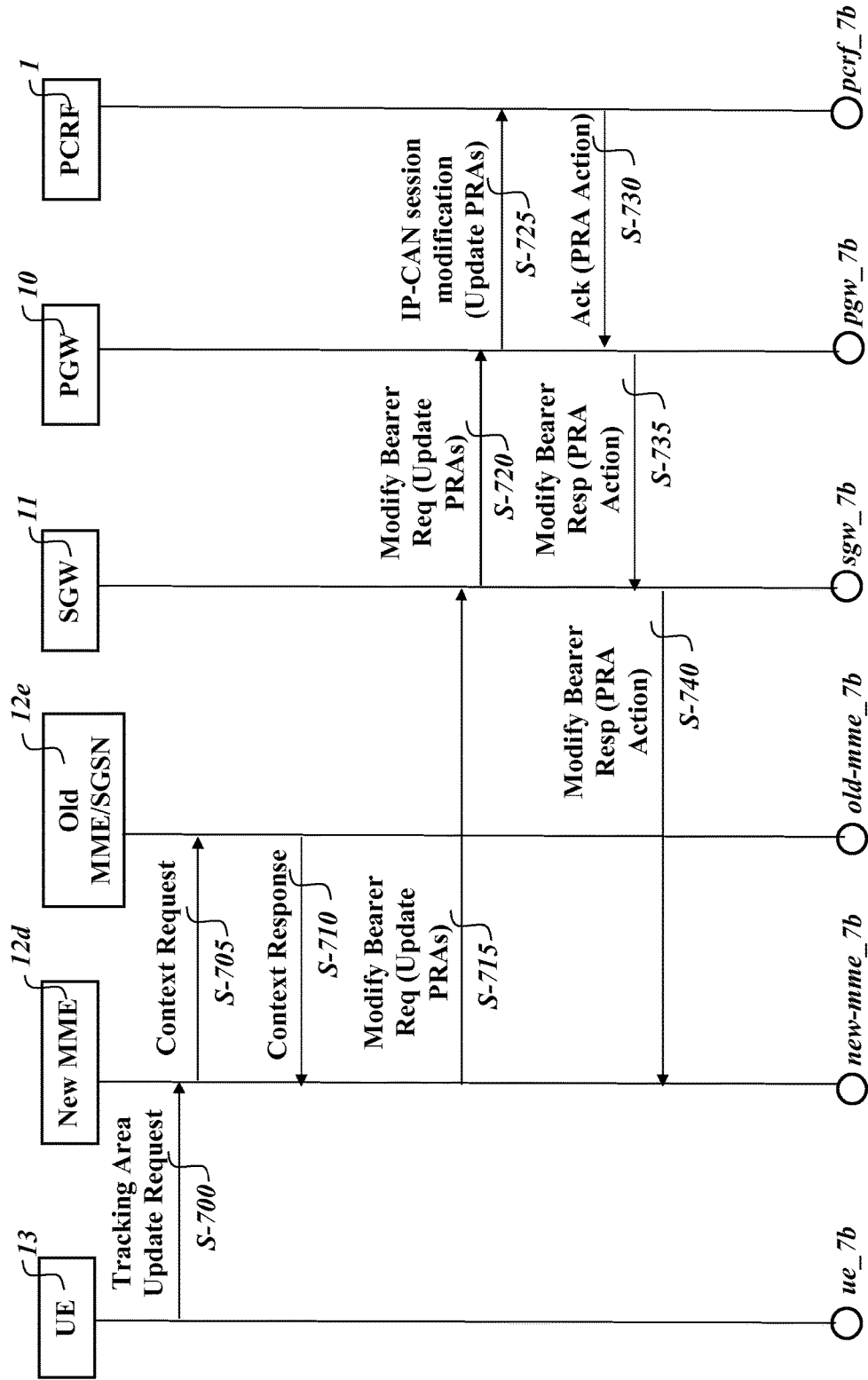
FIG.-7a-

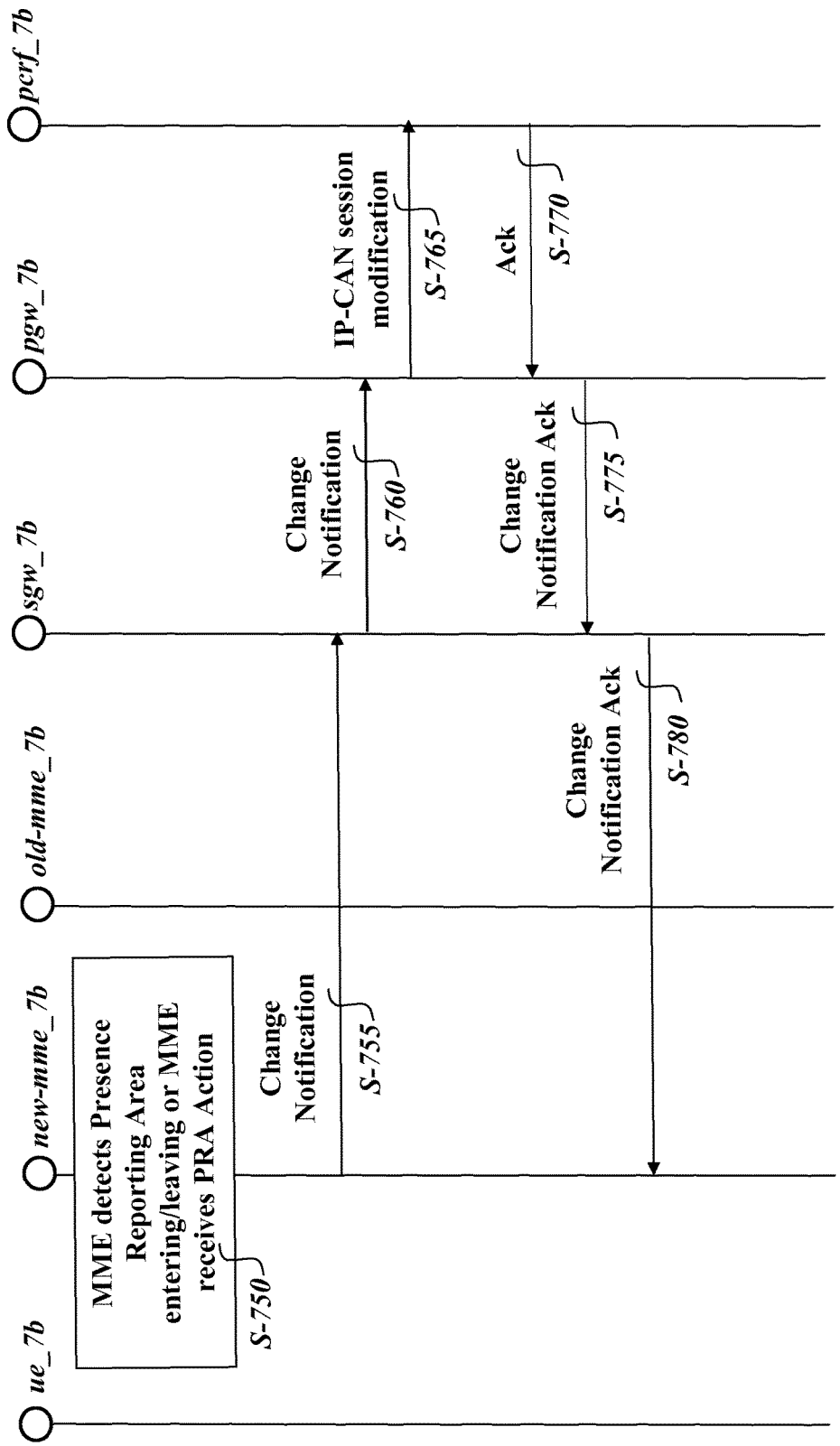
FIG. -7b-

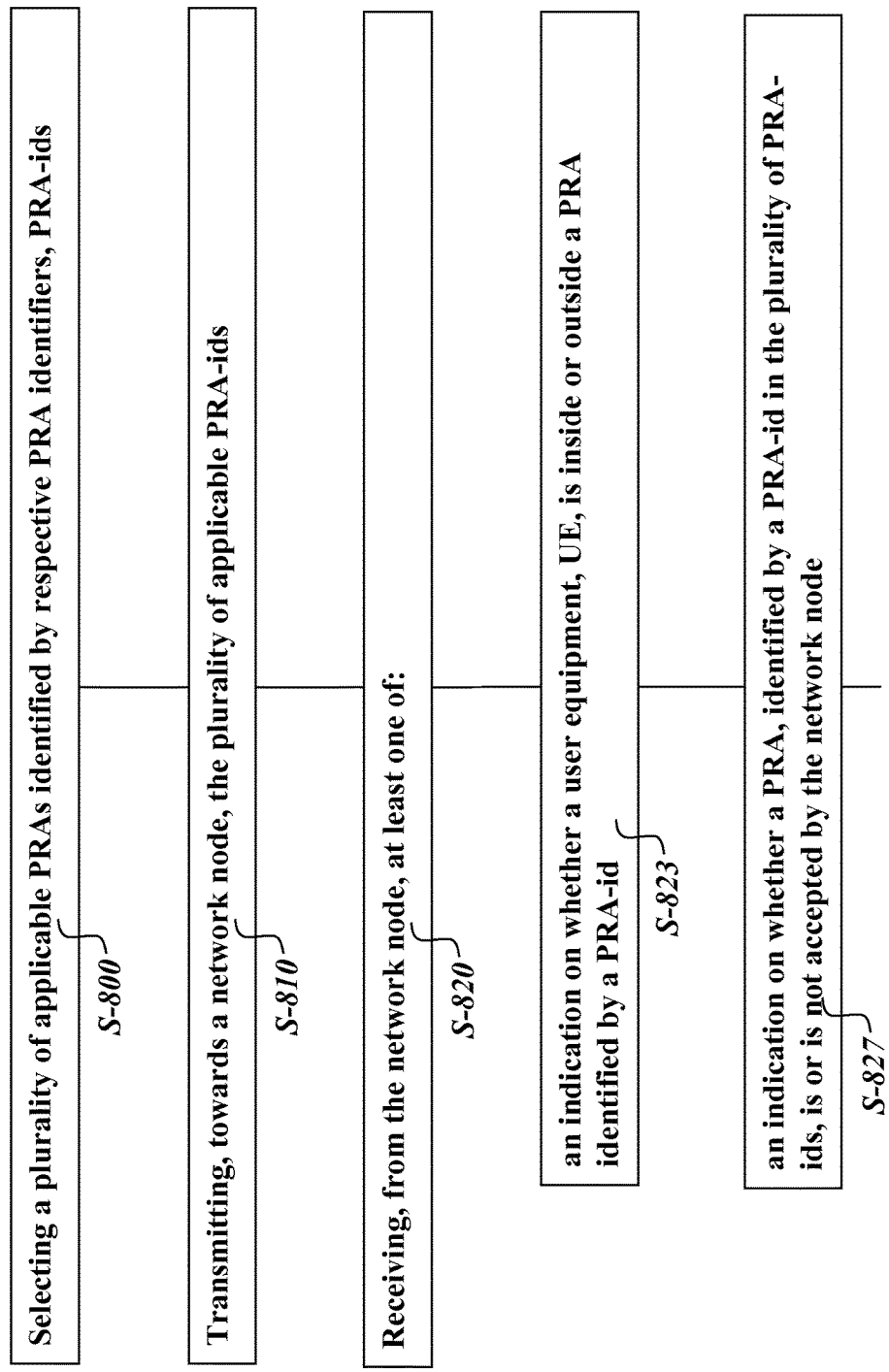
FIG. -8-

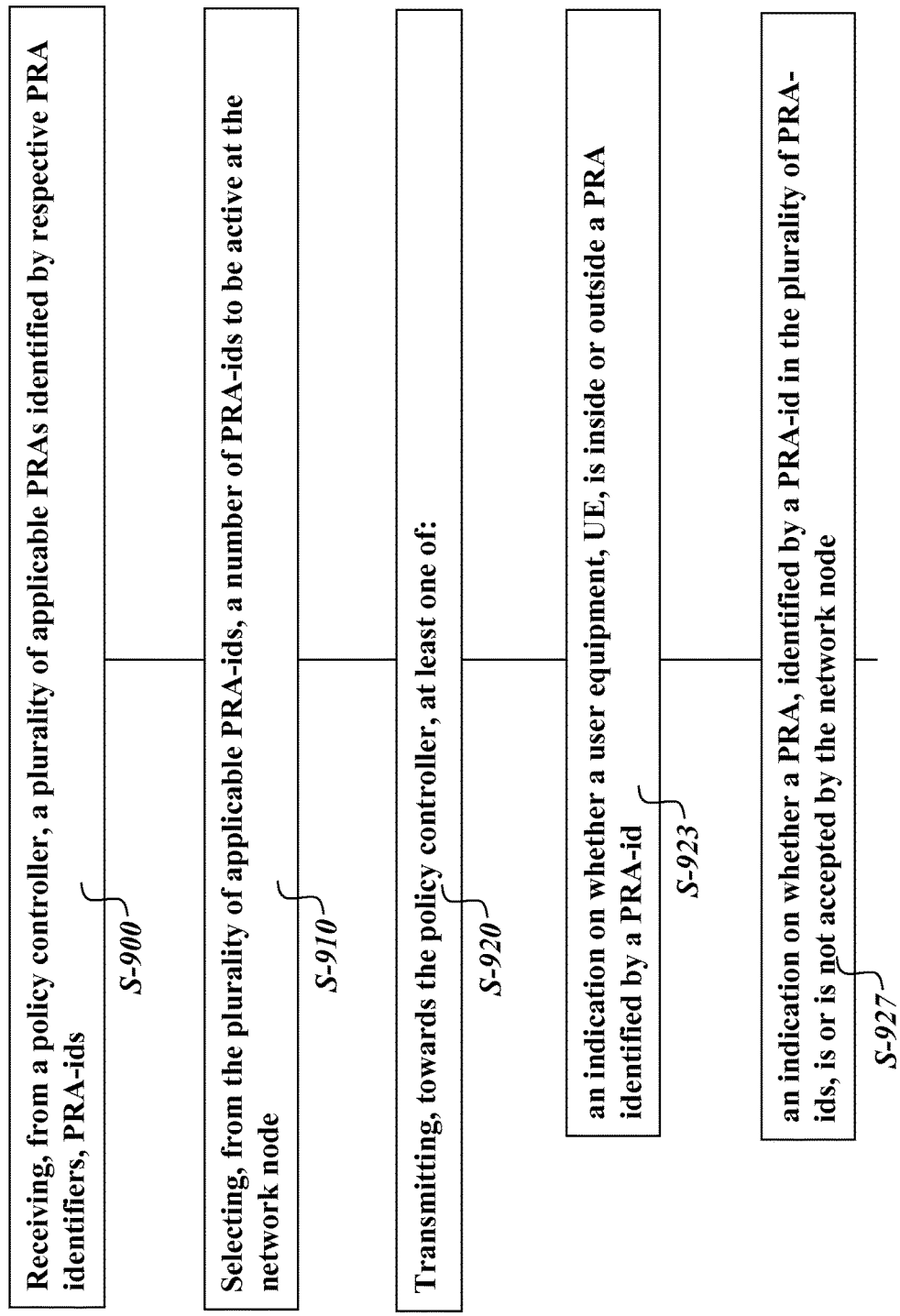

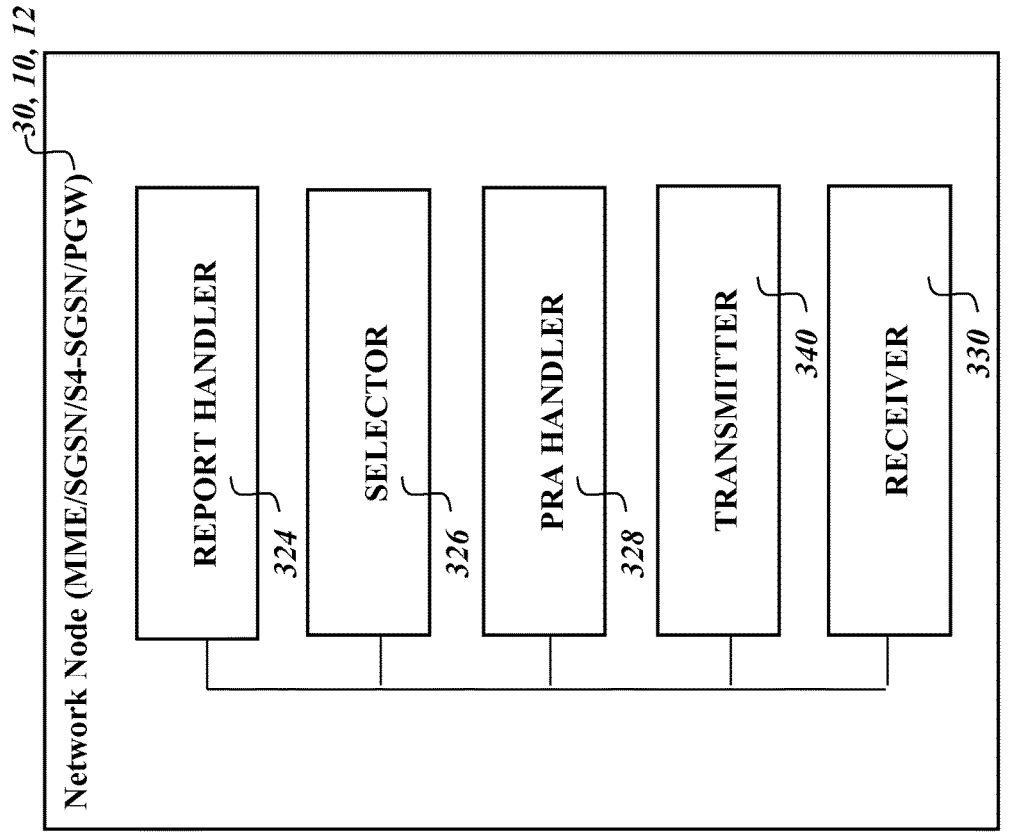
FIG. -11-
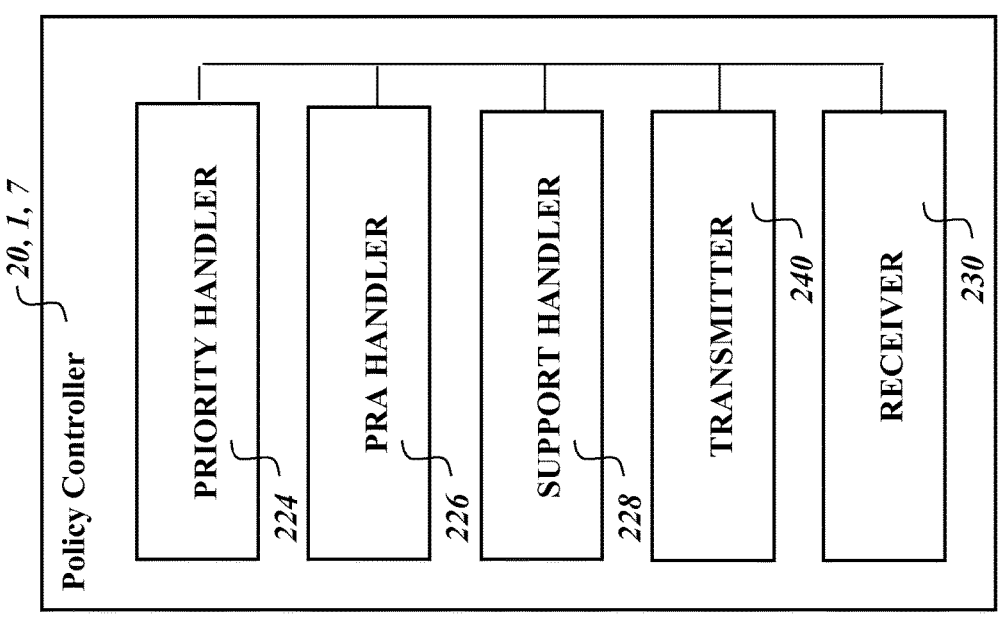
FIG. -10-

APPARATUSES AND METHODS FOR MULTIPLE PRESENCE REPORTING AREAS

PRIORITY

This nonprovisional application is a U.S. National Stage Filing under 35 U.S.C. § 371 of International Patent Application Serial No. PCT/EP2016/076966 filed Nov. 8, 2016, and entitled "Apparatuses And Method For Multiple Presence Reporting Areas" which claims priority to U.S. Provisional Patent Application No. 62/253,924 filed Nov. 11, 2015, both of which are hereby incorporated by reference in their entirety.

TECHNICAL FIELD

The present invention generally relates to handling of multiple Presence Reporting Areas; and, more specifically, where carried out in a heterogeneous Public Land Mobile Network.

BACKGROUND

The architecture supporting Policy and Charging Control (PCC) functionality is illustrated in FIG. 1 and disclosed in 3GPP TS 23.203 V13.4.0 that specifies the PCC functionality for Evolved 3GPP Packet Switched domain, including both 3GPP accesses (GERAN/UTRAN/E-UTRAN) and Non-3GPP accesses. For the purpose of the embodiments further discussed, the PCC architecture includes a Policy and Charging Rules Function (PCRF), a Policy and Charging Enforcement Function (PCEF) and an Online Charging System (OCS) to allow charging decisions. The 3GPP TS 23.203 discloses a Gx reference point (interface) between the PCRF and the PCEF, and a Gy reference point (interface) between the OCS and the PCEF.

The PCRF is in charge of policy control decision and flow based charging control, and provides network control for service data flow detection, gating, quality of service (QoS) and flow based charging towards the PCEF by holding policies and providing PCC rules to the PCEF per service data flow basis for enforcement of such policies. That is, with the PCC rules, the PCRF instructs the PCEF on the treatment of each service data flow.

The PCEF encompasses service data flow detection, policy enforcement and flow based charging functionalities by enforcing the PCC rules received from the PCRF.

In particular, the PCEF may be located at e.g. a gateway GPRS support node (GGSN) in a general packet radio service (GPRS) core network. The GPRS core network allows 2G, 3G and WCDMA mobile networks to transmit IP packets to external networks such as the Internet. Moreover, the PCEF may also be located at e.g. a packet data network gateway (PGW) in an evolved packet system (EPS) network. The PGW, which may also be abbreviated as PDN GW, is the point of interconnect between the evolved packet core (EPC) and the external IP networks. Furthermore, the PCEF may also be located at e.g. a packet data gateway (PDG) for connecting an untrusted WLAN network with a 3GPP network. In this scenario, the PDG may be a gateway to a specific packet data network, such as the internet or an operator service network.

In some use cases, policy control and/or charging decisions, such as QoS modification or charging rate change may depend on whether a user equipment (UE) is located inside or outside a specific area of interest, i.e. a Presence Reporting Area, and especially on whether the UE enters or leaves that specific area of interest.

3GPP Rel-12 standardized the concept of Presence Reporting Area (PRA) and a mechanism to report to PCRF and OCS when a UE enters or leaves a specific PRA, identified by a PRA identifier (PRA-id). PRAs are supposed to help the operator to provide services when a UE enters or leaves an area of interest, e.g. provide free quota at home or at a coffee shop. Only one PRA-id can be provided by PCRF, through the PCEF, to a Mobility Management Entity (MME) or serving GPRS support node (SGSN) per IP-CAN session to reduce signalling. Both the PCRF and OCS can activate reporting when UE enters or leaves a PRA-id.

In this respect, 3GPP Rel-13 defines that the PCRF provides the PRA-id at IP-CAN session establishment, without prior knowledge of whether the PRA-id includes an area under the coverage of the MME/SGSN where the UE is attached. 3GPP TS 23.401 V13.4.0 defines that the source MME/SGSN provides the PRA-id at mobility and handover scenarios to a target MME/SGSN. The target MME/SGSN checks the E-UTRAN cell global identifier (ECGI) or cell global identity (CGI), hereinafter ECGI/CGI, where the UE is located versus the ECGI/CGIs defined as part of the PRA-id and then reports if the UE is inside or outside the PRA-id.

Whilst currently the PCRF just provides one PRA-id to the MME/SGSN, 3GPP Rel-14 is studying extensions to allow PCRF to provide multiple PRA-ids per IP-CAN session to the PCEF and the PCEF towards the MME/SGSN. More precisely, 3GPP TR 23.710 V0.1.0 defines a key issue to study how to control the number of PRA-ids to be monitored, and which are provided by PCRF via the PCEF to the MME/SGSN. The reason is that a large number of PRA-ids provided per IP-CAN session may cause too high load in MME/SGSN.

The key issue in this 3GPP TR 23.710 aims to provide a solution to support efficient resource handling in MME and SGSN. That means that the MME/SGSN will allow only a limited number of PRAs active per IP-CAN session. Provisioning of PRA-ids active in PCRF for an IP-CAN session would lead to inconsistent information in MME/SGSN and in PCRF and potential lack of reporting to PCRF.

In view of 3GPP TS 23.401 V13.4.0, at mobility from source to target MME/SGSN, reporting that a UE enters or leaves a certain PRA-id would lead to inconsistencies between the list of PRA-ids active for the IP-CAN session in the PCRF and the PRAs that are active in the MME/SGSN to fulfil the requirement for efficient resource handling.

Moreover, in view of 3GPP TS 23.401 V13.4.0, at mobility from an MME/SGSN compliant with 3GPP Rel-12 to another MME/SGSN compliant with 3GPP Rel-14, the target MME/SGSN will only receive one PRA from the old MME/SGSN and it will not know about the other PRAs that apply to the IP-CAN session,

SUMMARY

The present invention is aimed to at least minimize the above drawbacks and provides for a new method of handling a plurality of PRAs as well as a policy controller, a policy enforcer, and other network nodes cooperating to carry out such method.

In particular, the policy controller may be a PCRF server or an OCS, the policy enforcer may be a PCEF device, and the other network nodes may be any one of an MME, a SGSN, a service gateway (SGW), a PGW and combinations thereof.

Throughout this specification, a PCRF server is a network element arranged for carrying out the functionality of a PCRF in accordance with PCC standards; a PCEF device is a network element arranged for carrying out the functionality of a PCEF in accordance with PCC standards; and an OCS is a network element arranged for carrying out the functionality of an OCS in accordance with PCC standards. In addition, the PCRF server, the PCEF device and the OCS are enhanced to accomplish the objects of the present invention.

In accordance with a first aspect of the present invention, there is provided a policy controller in charge of policy control and/or charging decisions, the policy controller configured to select a plurality of applicable PRAs, identified by respective PRA-ids, and to transmit the plurality of applicable PRA-ids towards a network node.

In particular, the applicable PRAs may be selected per packet data network (PDN) connection basis, IP Connectivity Access Network (IP-CAN) session basis, or both.

In an embodiment, the policy controller may be configured to assign a priority to each PRA-id in the plurality of PRA-ids.

In an embodiment, the plurality of applicable PRA-ids and, optionally, the respective priorities, may be transmitted towards the network node via one or more further network nodes. In an embodiment, the policy controller may also be configured to transmit with the plurality of applicable PRA-ids, towards the network node and for each PRA-id, a list of elements composing the corresponding PRA.

In an embodiment, the policy controller may be configured to receive an indication on whether a UE is inside or outside a PRA identified by a PRA-id. In particular, the indication may be received via the one or more further network nodes.

In an embodiment, the policy controller may be configured to receive an indication on whether a PRA, identified by a PRA-id in the plurality of PRA-ids, is or is not accepted by the network node. In particular, the indication may be received via the one or more further network nodes. In an embodiment, the policy controller may be configured to receive, from the network node or from a further network node, an indication on whether multiple PRAs is or is not supported.

In particular, the network node may be an MME, an SGSN, an SGSN supporting a so-called S4 interface (S4-SGSN), and a PGW. Also in particular, the one or more further network nodes may include any one of a PGW and a SGW. In an embodiment, the one or more further network nodes may include a policy enforcer.

In accordance with a second aspect of the present invention, there is provided a network node in charge of handling mobility of user equipment (UE), the network node configured to receive, from a policy controller, a plurality of applicable PRAs, identified by respective PRA-ids, and to select from the plurality of applicable PRA-ids a number of PRA-ids to be active at the network node. In particular, the plurality of applicable PRA-ids may be received via one or more further network nodes.

In an embodiment, the active PRA-ids may be selected for a packet data network (PDN) connection, an IP Connectivity Access Network (IP-CAN) session, or both.

In an embodiment, the active PRA-ids may be selected taking into account a maximum number of PRA-ids supported by the network node.

In an embodiment, the active PRA-ids may be selected taking into account a priority assigned at the network node to each PRA-id in the plurality of PRA-ids.

In an embodiment, the network node may further be configured to receive, from the policy controller, the priority assigned to each PRA-id in the list of PRA-ids. In an embodiment, the network node may also be configured to receive with the plurality of applicable PRA-ids, from the policy controller and for each PRA-id, a list of elements composing the corresponding PRA.

In an embodiment, the network node is further configured to transmit, towards the policy controller, an indication on whether a UE is inside or outside a PRA identified by a PRA-id. In particular, the indication may be transmitted via the one or more further network nodes.

In an embodiment, the network node is further configured to transmit, towards the policy controller, an indication on whether a PRA, identified by a PRA-id in the plurality of PRA-ids, is or is not accepted by the network node. In particular, the indication may be transmitted via the one or more further network nodes.

In particular, a PRA-id may be not accepted if the maximum number of PRA-ids supported by the network node has been reached.

In an embodiment, the network node may further be configured to store the received list of PRA-ids and, optionally, the received list of elements composing the corresponding PRA and the received priorities respectively assigned to each PRA-id in the plurality of PRA-ids.

In an embodiment, the network node, acting as a source network node, may be configured to transmit, towards a target network node, the received plurality of PRA-ids and, optionally, the received list of elements composing the corresponding PRA and the received priorities respectively assigned to each PRA-id in the plurality of PRA-ids.

In an embodiment, if the source network node only supports one PRA-id, the target network node is configured to retrieve the plurality of applicable PRA-ids from the policy controller. In an embodiment, if the target node only supports one PRA-id, the source network node may transmit only the PRA-id with the highest priority assigned at the source network node.

In an embodiment, the source network node is one of an MME and a SGSN, and the target network node is one of an MME and a SGSN. As particularly commented above, the network node may be an MME, an SGSN, an S4-SGSN, and a PGW. Also in particular, the one or more further network nodes may include any one of a PGW and a SGW; whereas the policy controller may be any one of a PCRF server and an OCS.

In accordance with a third aspect of the present invention, there is provided a method of handling a plurality of PRAs, the method carried out by the policy controller and comprising steps aligned with the actions performed by the policy controller as discussed above and further detailed in the detailed description.

In accordance with a fourth aspect of the present invention, there is provided a method of handling a plurality of PRAs, the method carried out by the network node and comprising steps aligned with the actions performed by the network node as discussed above and further detailed in the detailed description.

On the other hand, the invention may be practised by a computer program, in accordance with a fifth aspect of the invention, the computer program being loadable into an internal memory of a computer with a receiver and a transmitter as well as with a processor, and comprising executable code adapted to carry out the above method steps. In particular, this executable code may be recorded in a carrier readable in the computer.

As used herein, the word "comprising" does not exclude the presence of other elements or steps than those listed and the words "a" or "an" preceding an element do not exclude the presence of a plurality of such elements. Further, any reference signs do not limit the scope of the claims, that the invention may be at least in part implemented by means of both hardware and software, and that several "means" or "units" may be represented by the same item of hardware. The above mentioned and described embodiments are given as examples of the present invention and are not be limited to the present invention.

BRIEF DESCRIPTION OF THE DRAWINGS

The features, objects and advantages of the invention will become apparent by reading this description in conjunction with the accompanying drawings, in which:

FIG. 1 illustrates a Policy and Charging Control (PCC) architecture in accordance with 3GPP TS 23.203 V13.4.0, the PCC architecture complemented with a UDR in accordance with 3GPP TS 23.335 V12.0.0.

FIG. 2 shows a basic component structure of a policy controller, such as e.g. a PCRF server or an OCS, in accordance with an embodiment.

FIG. 3 shows a basic component structure of a network node, such as e.g. an MME or SGSN, in accordance with an embodiment.

FIG. 4a and FIG. 4b show an exemplary Initial attachment procedure followed by a change of MME/SGSN.

FIG. 5a and FIG. 5b show an exemplary Tracking Area Update (TAU) procedure with a change of MME/SGSN.

FIG. 6 shows an exemplary Attach procedure with PRA activation and reporting.

FIG. 7a and FIG. 7b show an exemplary Tracking Area Update procedure with MME/SGSN change and location change notification procedure.

FIG. 8 illustrates a method of handling a plurality of PRAs, the method carried out by a policy controller in charge of policy control and/or charging decisions.

FIG. 9 illustrates a method of handling a plurality of PRAs, the method carried out by a network node in charge of handling mobility of a UE, FIG. 10 shows a basic component structure of a policy controller, such as e.g. a PCRF server or an OCS, in accordance with another embodiment.

FIG. 11 shows a basic component structure of a network node, such as e.g. an MME or SGSN, in accordance with another embodiment.

DETAILED DESCRIPTION

The following describes currently preferred embodiments of a policy controller, a policy enforcer and respectively executed methods for handling multiple Presence Reporting Areas with other network nodes, such as e.g. MME/SGSN.

In particular, the policy controller 20 illustrated in FIG. 2 and FIG. 10 may be any one of a PCRF server 1 or an OCS 7 of the PCC architecture illustrated in FIG. 1. Also in particular, the policy enforcer may be any one of a PCEF device 2, a BBERF device 9 and a TDF device 4 of the PCC architecture illustrated FIG. 1.

Moreover, the PCEF device 2, the BBERF device 9 and TDF device 4 may co-exist in at least some embodiments discussed throughout this specification, so that nothing prevents the policy controller from communicating with more than one policy enforcer, even if not all the exemplary policy enforcers are illustrated in drawings.

For the sake of simplicity, the policy controller may be simply referred to in some embodiments as the PCRF, whereas the policy enforcer may be simply referred to as the PCEF.

Embodiments throughout this specification make use of one or more principles listed below to select from a policy controller 20, e.g. a PCRF server 1 or OCS 7, a list of PRA-ids relevant to other network nodes, such as e.g. MME/SGSN.

i) The PCRF selects a list of applicable PRA-ids for a PDN connection, if the PCRF is configured to know that the PLMN supports multiple PRAs, and the PCRF may assign a priority per PRA-id transmitted to the MME/SGSN via PGW.

ii) The MME/SGSN selects the PRA-ids to be active for the PDN connection taking into account both a maximum number of PRAs supported by the MME/SGSN and the priority per PRA-id.

iii) The MME/SGSN returns to the PCRF, via PCEF, an indication on whether the UE is inside or outside a PRA-id and likely on whether the PRA-id is or not accepted by the MME/SGSN, due to e.g. maximum number of PRAs was reached. The MME/SGSN selects the PRA-id using the priority per PRA-id. The MME/SGSN may store the complete list of PRA-id and their priorities. The PCRF may provide an indication that some services are not available at a PRA-id.

iv) At mobility, the source MME/SGSN sends the list of PRA-ids and its respective priority to the target MME/SGSN. The target MME/SGSN selects the PRA-ids to be active for the PDN connection taking into account both the maximum number of PRAs supported by the MME/SGSN and the priority per PRA-id and may behave as in iii).

v) If the UE moves from an MME/SGSN supporting only one PRA (i.e. 3GPP Rel-12 compliant) to an MME/SGSN supporting multiple PRAs (3GPP Rel-14 compliant), the target MME/SGSN should contact the PCRF, via the PCEF, to retrieve the complete list of PRAs.

A possible embodiment for this solution is that the PCRF reports the list of PRAs and respective priorities to the MME via the so-called Sx interface and the MME reports the PRA-id not accepted to the PCRF also via Sx interface.

Exemplary parameters that can be included in messages between PCRF, PCEF (PGW) and MME/SGSN are described in the following.

Presence-Reporting-Area-Information AVP

The Presence-Reporting-Area-Information AVP contains information which describes a Presence Reporting Area.

The Presence-Reporting-Area-Identifier AVP defines a unique identifier for a Presence Reporting Area.

The Presence-Reporting-Area-Status AVP indicates the status of UE for a Presence Reporting Area.

The Presence-Reporting-Area-Elements-List AVP contains, for a UE-dedicated Presence Reporting Area, the elements of the Presence Reporting Area. For a core network pre-configured Presence Reporting Area, the element list might not be present.

When the Presence Reporting Area is UE-dedicated, the PCRF may acquire the Presence Reporting Area information from the SPR.

AVP Format:
Presence-Reporting-Area-Information::=<AVP Header: 2822>
   [Presence-Reporting-Area-Identifier]
   [Presence-Reporting-Area-Status]
   [Presence-Reporting-Area-Elements-List]
   [Presence-Reporting-Area-Priority]
   *[AVP]
Presence-Reporting-Area-Status AVP The Presence-Reporting-Area-Status AVP indicates whether the UE is inside, or outside of the Presence Reporting Area or if the Presence Reporting Area is unknown.

The following values are defined in this specification:
   0 (In area): This value shall be used to indicate that the UE is inside or enters the Presence Reporting Area
   1 (Out of area): This value shall be used to indicate that the UE is outside or leaves the Presence Reporting Area
   2 (Presence Reporting Area Not Accepted): This value shall be used to indicate that the Presence Reporting Area is not accepted by the MME. Alternatively, the indication of rejected PRAs can be implicitly indicated by leaving out the rejected PRAs when MME responds back IN/OUT per PRA The solution proposed throughout this specification presents advantages over currently existing solutions.

The proposed solution allows the operator to know what services can be provided per PRA-id when MME/SGSN limits the number of PRAs.

The proposed solution guarantees that services available in multiple PRAs can be supported even if there are some limitations on the MME/SGSN.

The proposed solution allows handling of multiple PRAs in a heterogeneous network with MME from different vendors with different characteristics, that is, MMEs supporting different maximum of PRAs.

The proposed solution gives the MME/SGSN the possibility to reject requests of PRAs on a per PRA level e.g. if there is a risk for node overload.

In an embodiment of the invention, an exemplary Initial Attach procedure followed by a Change of MME/SGSN is discussed in the following with reference to FIG. 4a and FIG. 4b.

In this embodiment illustrated in FIG. 4a, during step S-401, the MME-1 12a sends a Create Session Request message towards the SGW 11. During step S-402, the SGW 11 sends Create Session Request message towards the PGW 10. During step S-403, the PGW 10 sends and IP-CAN session establishment towards the PCRF 1. The PGW 10 informs to the PCRF 1 that multiple PRAs are supported.

During step S-404, the PCRF is interested in knowing whether the UE enters or leaves several specific areas in order to take policy control decisions, such as QoS or authorized PCC rules. So, the PCRF 1 answers the IP-CAN session establishment requesting reporting indication of several Presence Reporting Areas, sending the PRA identifier of each area, the list of elements composing the PRA and the priority of each PRA. Besides the PCRF 1 subscribes to Change of UE presence in Presence Reporting Area, by sending the PRA event-trigger.

During step S-405, the PGW 10 answers Create Session message to SGW 11. During step S-406, the SGW 11 answers Create Session message to the MME-1 12a. During step S-407, the MME-1 12a selects the PRA-ids to be active for the PDN connection taking into account both the load generated per PRA and the priority per PRA-id. The MME-1 might store the complete list of PRA-id and their priorities, or just the accepted in its service area, or all accepted PRAs (which can include PRAs not in its service area).

During step S-408, the MME-1 12a sends the Change Notification message to the SGW 11 indicating whether the UE is inside or outside a PRA-id and whether the PRA-id is not accepted by the MME-1, due to e.g. Maximum Number of PRAs was reached. During step S-409, the SGW 11 sends the Change Notification message to the PGW 10. During step S-410, the PGW 10 sends the IP-CAN session modification towards the PCRF 1 reporting the presence reporting area status and presence reporting area identifier of each PRA previously sent by PCRF 1.

During step S-411, the PCRF evaluates policies taking into account the Presence Reporting Area information received and it decides to downgrade the QoS since the user has entered a PRA subject to be congested according to PCRF local configuration. The PCRF 1 may also provide an indication to the operator that some services are not available at a PRA-id. The PCRF 1 may also notify the user, via SMS or mail, that a service is not available in the current location.

During step S-412, the PCRF 1 answers the IP-CAN session modification including the downgraded QoS. During step S-413, the PGW 10 answers the Change Notification message to the SGW 11. During step S-414, the SGW answers the Change Notification message to the MME-1 12a. During step S-415, the UE moves to a new MME-2 12b and then MME-1 12a sends towards MME-2 the list of Presence Reporting Area applicable to the UE received from PCRF. All the PRAs and their priorities are sent to MME-2.

As FIG. 4b illustrates, during step S-416, the MME-2 12b selects the PRA-ids to be active for the PDN connection taking into account both the Maximum Number of PRAs supported by the MME-2 and the priority per PRA-id. MME-2 stores the complete list of PRA-id and their priorities. During step S-417, the MME-2 12b answers to MME-1 12a. During step S-418, the MME-2 sends a message to SGW 11 with an indication to PCRF 1 to update the PRAs and might also include indications whether the UE is inside or outside a PRA-id and whether the PRA-id is not accepted by the MME-2 12b.

During step S-419, the SGW 11 sends the Change Notification message to the PGW 10. During step S-420, the PGW 10 sends the IP-CAN session modification towards the PCRF 1 reporting the Presence Reporting Area status and Presence Reporting Area identifier of each PRA previously sent by PCRF 1. During step S-421, the PCRF evaluates policies and it decides to authorize new PCC rules as the UE enters an area belonging to a shopping center. The PCRF 1 may also provide an indication to the operator that some services are not available at a PRA-id.

During step S-422, the PCRF 1 answers the IP-CAN session modification including the new authorized PCC rules. During step S-423, the PGW 10 answers the Change Notification message to the SGW 11. During step S-424, the SGW 11 answers the Change Notification message to the MME-2 12b.

In an embodiment of the invention, an exemplary Tracking Area Update (TAU) procedure with a change of MME/SGSN is discussed in the following with reference to FIG. 5a and FIG. 5b.

In this embodiment illustrated in FIG. 5a, steps S-500 to S-510 correspond to the Tracking Area Update procedure in TS 23.401, clause 5.3.3.1 steps 2, 3, 4 and 5, containing the PRAs received at new MME 12d from old MME 12c.

In FIG. 5a, steps S-515 to S-525 include an indication to the PCRF 1 to update PRAs, and these steps also include indicating whether the UE is inside/outside accepted PRAs and indicating the rejected PRAs received in the Context Request.

In FIG. 5a, steps S-530 to S-540 correspond to the Tracking Area Update procedure in TS 23.401 clause 5.3.3.1 steps 9a, 10, and 11, but here with an added PRA Action including new PRAs.

In FIG. 5a and FIG. 5b, steps S-545 to S-560 include reporting on whether UE is inside or outside accepted PRAs, and indications on rejected PRAs. The new MME 12d detects PRA entering or leaving, or the new MME 12d receives PRA action. The PRA Action is only sent if PCRF 1 decides an update of PRAs is necessary.

In FIG. 5b, steps S-565 to S-575 correspond to steps 4-5 in the Location Change Reporting Procedure disclosed in TS 23.401 sub-clause 5.9.2.

Generally speaking, in order to assure that MME/SGSN has the ability to reject incoming PRA requests from PCRFs or OCS (e.g. for dimensioning purposes), a rejection mechanism is introduced. In this respect, when a PCRF 1 or OCS 7 wants to activate PRAs for a PDN connection it sends the complete list of PRAs. MME/SGSN then responds back with IN/OUT for each accepted PRA ID and an implicit or explicit indication per PRA ID for the ones that were rejected at activation time, if any. The accepted PRAs are stored in the MME/SGSN. To know which PRAs to reject a prioritization is needed, either implicitly or explicitly stated in the request received from the PCRFs or OCS.

In an embodiment of the invention, an exemplary Attach procedure with PRA activation and reporting is discussed in the following with reference to FIG. 6.

In this embodiment illustrated in FIG. 6, step S-600 corresponds to steps 1-11 as in the Attach procedure in TS 23.401. Steps S-605 to S-615 correspond to steps 12-14a as in the Attach procedure in TS 23.401.

In FIG. 6, during step S-620, an ACK message includes a list of PRAs to be activated and a prioritization per PRA. During steps S-625 and S-630, the Modify Bearer Response includes a list of PRAs and a prioritization per PRA in PRA Action. PRA Action may include multiple PRA-ids and/or definitions. It may also include a prioritization per PRA. The MME/SGSN 12 may store the accepted PRAs and, potentially, the rejected PRAs.

In FIG. 6, step S-635 corresponds to steps 17-22 as in the Attach procedure in TS 23.401.

In FIG. 6, during steps S-640 and S-645, a Modify Bearer Request includes the PRA Information with MME accepted PRAs to perform reports upon, i.e. the PRA(s) and an indication of whether the UE is inside or outside for each PRA. PRA Information also explicitly or implicitly indicates rejected PRA(s).

In FIG. 6, during steps S-650 and S-655, the PDN GW 10 forwards the PRA Information to the PCRF 1, to the OCS 7 or to both as defined in TS 23.203, and receives the acknowledge.

In FIG. 6, steps S-660 and S-665 correspond to steps 23b-24 as in the Attach procedure in TS 23.401.

At a mobility procedure including an MME/SGSN change, the accepted PRAs are sent from the old MME/SGSN to the new MME/SGSN. Only MME/SGSN within the operator's network sends the list of PRAs.

Making the PCRF and OCS aware that an MME/SGSN change has been performed, an indication (Update PRAs) in the mobility procedure is sent. PCRF or OCS can then send a new list of PRAs replacing the old PRA list. The new MME/SGSN evaluates the PRAs in the list from the PCRF or OCS and performs reports in following Location Change Reporting including the PRA(s) and an indication of whether the UE is inside or outside each PRA. PRA Information also explicitly or implicitly indicates any potentially rejected PRA(s). In particular, if homogenous dimensioning is used in operator's network the indication at MME/SGSN change (Update PRAs) is not needed.

In an embodiment of the invention, an exemplary Tracking Area Update procedure with MME/SGSN change and location change notification procedure is discussed in the following with reference to FIG. 7a and FIG. 7b. For the sake of simplicity, this Tracking Area Update procedure is described and illustrated to only include relevant steps for indication of MME/SGSN change.

In this embodiment illustrated in FIG. 7a, steps S-700 to S-710 correspond to steps 2-5 as in the Tracking Area Update procedure in TS 23.401, containing the PRAs received at new MME 12d from old MME/SGSN 12e.

In FIG. 7a, steps S-715 to S-725 correspond to step 9-11 as in the Tracking Area Update procedure in TS 23.401, and including an indication to PCRF 1 to update PRAs, these steps also include whether the UE is inside/outside accepted PRAs and indication of rejected PRAs based on PRAs received in the Context Response. The Context Response includes a list of PRAs and, optionally, a prioritization (or priority) per PRA. The Context Response may include multiple PRA-ids and/or definitions. It may also include a prioritization (or priority) per PRA-id.

In FIG. 7a, steps S-730 to S-740 correspond to steps 11-13 as in the Tracking Area Update procedure in TS 23.401, but here with PRA Action including the list of PRAs and a prioritization (or priority) per PRA. The PRA Action may include multiple PRA-ids and/or definitions. It may also include a prioritization (or priority) per PRA-id. The PRA Action is only sent if PCRF decides an update of PRAs is necessary. The new MME 12d may store the accepted PRAs and, potentially, the rejected PRAs.

In FIG. 7b, step S-750 corresponds to step 1d in the Location Change Reporting Procedure in TS 23.401 and including the MME receives a PRA Action from step S-740. Steps S-755 to S-765 correspond to steps 2-4 in the Location Change Reporting Procedure in TS 23.401 reporting on whether UE is inside or outside accepted PRAs, and indications on rejected PRAs, if any. Steps S-770 to S-780 correspond to Steps 4-5 in the Location Change Reporting Procedure in TS 23.401.

For the sake of clarity, some concepts associated with multiple PRAs may be useful for a reader. In this respect, an MME Pool Area is defined as an area within which a UE may be served without need to change the serving MME. An MME Pool Area is served by one or more MMEs ("pool of MMEs") in parallel. MME Pool Areas are a collection of complete Tracking Areas. MME Pool Areas may overlap each other.

Also in this respect, a Presence Reporting Area is defined within 3GPP Packet Domain for the purposes of reporting of UE presence within that area due to policy control and/or charging reasons. In case of E-UTRAN, a Presence Reporting Area may consist of a set of neighbor or non-neighbor Tracking Areas, or eNBs and/or cells. There are two types of Presence Reporting Areas: "UE-dedicated Presence Reporting Areas" and "Core Network pre-configured Presence Reporting Areas" that apply to an MME pool.

In the procedures discussed above with reference to FIG. 4a-4b, FIG. 5a-5b, FIG. 6, and FIG. 7a-7b, a reader can easily identify methods of handling a plurality of PRAs, the methods respectively carried out by a policy controller 20, such as e.g. PCRF 1 and OCS 7, and by a network node 30, such as e.g. MME 12 and PGW 10.

FIG. 8 illustrates a method of handling a plurality of PRAs, the method carried out by a policy controller 20 in charge of policy control and/or charging decisions.

As illustrated in FIG. 8, this method comprises a step S-800 of selecting a plurality of applicable PRAs identified by respective PRA-ids; a step S-810 of transmitting, towards a network node 30, the plurality of applicable PRA-ids; and a step S-820 of receiving, from the network node 30, at least one of: an indication S-823 on whether a UE 13 is inside or outside a PRA identified by a PRA-id, and an indication S-827 on whether a PRA, identified by a PRA-id in the plurality of PRA-ids, is or is not accepted by the network node 30.

FIG. 9 illustrates a method of handling a plurality of PRAs, the method carried out by a network node 30 in charge of handling mobility of a UE 13.

As illustrated in FIG. 9, this method comprises a step S-900 of receiving, from a policy controller 20, a plurality of applicable PRAs identified by respective PRA-ids; a step S-910 of selecting, from the plurality of applicable PRA-ids, a number of PRA-ids to be active at the network node; and a step S-920 of transmitting, towards the policy controller 20, at least one of: an indication S-923 on whether a UE 13 is inside or outside a PRA identified by a PRA-id, and an indication S-927 on whether a PRA, identified by a PRA-id in the plurality of PRA-ids, is or is not accepted to be active by the network node 30.

Participating in the above methods and exemplary embodiments there is provided a policy controller 20, as schematically illustrated in FIG. 2 and FIG. 10.

In accordance with an embodiment illustrated in FIG. 2, the policy controller 20 may comprise a data memory 218 configured to store a plurality of PRA-ids identifying a respective plurality of PRAs and to optionally store a list of elements composing each PRA and a priority assigned to each PRA-id in the plurality of PRA-ids; and a PRA handler 226 configured to select a list of applicable PRAs, identified by respective PRA-ids, and to transmit, towards a network node 30 via a transmitter 240, the list of applicable PRA-ids and, optionally, the list of elements composing each PRA and the priority assigned to each PRA-id.

In an embodiment, the list of applicable PRA-ids and, optionally, the respective lists of elements and priorities, are transmitted towards the network node via one or more further network nodes. In particular, the network node may be an MME or SGSN. Also in particular, the one or more further network nodes may include any one of a PGW and a SGW. In particular, the one or more further network nodes may include a policy enforcer, such as e.g. the PCEF 2 illustrated in FIG. 1.

Also in accordance with this embodiment, the policy controller 20 may comprise, as shown in FIG. 2, a priority handler 224 configured to assign a priority to each PRA-id in the list of PRA-ids.

Also in accordance with this embodiment, the policy controller 20 may comprise, as shown in FIG. 2, a support handler 228 configured to receive, from a network node 30 via a receiver 230, an indication on whether a UE is inside or outside a PRA-id and/or an indication on whether a PRA-id in the list of PRA-ids is or is not accepted by a network node 30.

In particular, the policy controller 20 illustrated in FIG. 2 may comprise a processor 220 configured to obtain, from a subscription repository, a list of PRA-ids applicable for a UE.

Further in this embodiment, the PRA handler 226 may be configured to receive, from the network node 30 via the receiver 230, a request for a list of PRA-ids applicable at the network node, and transmit, to the network node 30 via the transmitter 240, the list of applicable PRA-ids.

The policy controller 20 shown in FIG. 2 may also comprise at least one processor 220 and at least one memory 210, both in communication with each other, with the priority handler 224, the PRA handler 226, the support handler 228, the receiver 230 and the transmitter 240, and with other elements or units of the policy controller 20. The at least one memory 210 may comprise volatile and/or non-volatile memory. In particular, the at least one memory 210 may have a computer program 214 and data 218 stored therein. The computer program 214 may be loaded in the at least one memory 210 from a computer program product 250, such as any non-transitory computer readable medium, in which the computer program is stored. The data 218 may comprise a plurality of PRA-ids identifying a respective plurality of PRAs and to optionally store a list of elements composing each PRA and a priority assigned to each PRA-id in the plurality of PRA-ids. The at least one processor 220 may be configured to carry out the functions of the priority handler 224, the PRA handler 226 and the support handler 228.

In accordance with a further embodiment, the policy controller 20 may comprise, as shown in FIG. 2, at least one processor 220, and at least one memory 210 that stores processor-executable instructions 214. In this policy controller, the at least one processor interfaces with the at least one memory to execute the processor-executable instructions, so that the policy controller is operable to perform the actions disclosed above.

In accordance with another embodiment illustrated in FIG. 10, the policy controller 20 may comprise a priority handler 224, a PRA handler 226, a support handler 228, a receiver 230 and a transmitter 240.

In this another embodiment, the PRA handler 226 may be configured to select the list of applicable PRAs, identified by respective PRA-ids, and to transmit, towards a network node 30 via the transmitter 240, the list of applicable PRA-ids and, optionally, the list of elements composing each PRA and the priority assigned to each PRA-id.

If the optional priorities are implemented for the PRA-ids, the priority handler 224 may be configured to assign a priority to each PRA-id in the list of PRA-ids.

Also in this another embodiment, the support handler 228 may be configured to receive, from the network node 30 via the receiver 230, an indication on whether a UE is inside or outside a PRA-id and/or an indication on whether a PRA-id in the list of PRA-ids is or is not accepted by a network node 30.

The policy controller 20, in accordance with any one of the embodiments illustrated in FIG. 2 and FIG. 10 may further be enhanced with features commented in the following.

In an embodiment of the policy controller 20, the applicable PRAs may be selected per at least one of packet data network (PDN) connection basis and IP Connectivity Access Network (IP-CAN) session basis. In particular, the PRAs may be selected by the processor 220 or the PRA handler 226.

In an embodiment, the policy controller 20 may further be operable to receive, from the network node or from a further network node via the receiver, an indication on whether multiple PRAs is or is not supported. In particular, this indication may be received and handled by the processor 220 or the PRA handler 226.

In an embodiment, the policy controller 20 may further be operable to receive any indication from the network node via one or more further network nodes. In particular, the one or more further network nodes may comprise any one of a PGW 10 and a SGW 11.

As already commented above, the policy controller 20 may be any one of a PCRF server 1 and an OCS 7, whereas the network node 30 may be any one of an MME 12, an SGSN, an S4-SGSN, and a PGW 10.

Participating in the above methods and exemplary embodiments there is provided a network node 30, such as an MME or SGSN, as schematically illustrated in FIG. 3 and FIG. 11.

In accordance with an embodiment illustrated in FIG. 3, the network node 30 may comprise a data memory 318 configured to store a list of applicable PRAs, identified by respective PRA-ids, and to optionally store a list of elements composing each PRA and a priority assigned to each PRA-id in the list of applicable PRA-ids; and a PRA handler 328 configured to receive, from a policy controller 20 via a receiver 330, the list of applicable PRA-ids and, optionally, the list of elements composing each PRA and the priority assigned to each PRA-id in the list of applicable PRA-ids.

In an embodiment, the list of applicable PRA-ids and, optionally, the respective lists of elements and priorities, may be received at the network node 30 via one or more further network nodes. In particular, the network node may be an MME or SGSN. Also in particular, the one or more further network nodes may include any one of a PGW and a SGW. In particular, the one or more further network nodes may include a policy enforcer, such as e.g. the PCEF 2 shown in FIG. 1.

Also in accordance with this embodiment, the network node 30 may comprise, as shown in FIG. 3, a selector 326 configured to select from the list of applicable PRA-ids a number of PRA-ids to be active at the network node; and a report handler 324 configured to transmit, towards the policy controller 20 via a transmitter 340, an indication on whether a UE is inside or outside a PRA-id and/or an indication on whether a PRA-id in the list of PRA-ids is or is not accepted by the network node.

In an embodiment, the PRA handler 328 may be configured to transmit, towards a target network node via the transmitter 340, the received list of PRA-ids and, optionally, the received lists of elements respectively composing each PRA and received priorities respectively assigned to each PRA-id in the list.

In an embodiment, the PRA handler 328 may be configured to request, to the policy controller via the transmitter 340, the list of applicable PRA-ids and, optionally, the lists of elements respectively composing each PRA and priorities respectively assigned to each PRA-id in the list.

The network node 30 shown in FIG. 3 may also comprise at least one processor 320 and at least one memory 310, both in communication with each other, with the report handler 324, the PRA handler 328, the selector 326, the receiver 330 and the transmitter 340, and with other elements or units of the network node 30. The at least one memory 310 may comprise volatile and/or non-volatile memory. In particular, the at least one memory 310 may have a computer program 314 and data 318 stored therein. The computer program 314 may be loaded in the at least one memory 310 from a computer program product 350, such as any non-transitory computer readable medium, in which the computer program is stored. The data 318 may comprise the list of applicable PRA-ids and, optionally, the list of elements composing each PRA and the priority assigned to each PRA-id in the list of applicable PRA-ids. The at least one processor 320 may be configured to carry out the functions of the report handler 324, the PRA handler 328 and the selector 326.

In accordance with a further embodiment, the network node 30 may comprise, as shown in FIG. 3, at least one processor 320, and at least one memory 310 that stores processor-executable instructions 314. In this network node, the at least one processor interfaces with the at least one memory to execute the processor-executable instructions, so that the network node is operable to perform the actions disclosed above.

In accordance with another embodiment illustrated in FIG. 11, the network node 30 may comprise a report handler 324, a selector 326, a PRA handler 328, a receiver 330 and a transmitter 340.

In this another embodiment, the PRA handler 328 may be configured to receive, from a policy controller 20 via a receiver 330, the list of applicable PRA-ids and, optionally, the list of elements composing each PRA and the priority assigned to each PRA-id in the list of applicable PRA-ids.

Also in this another embodiment, the selector 326 may be configured to select from the list of applicable PRA-ids a number of PRA-ids to be active at the network node; and the report handler 324 may be configured to transmit, towards the policy controller 20 via the transmitter 340, an indication on whether a UE is inside or outside a PRA-id and/or an indication on whether a PRA-id in the list of PRA-ids is or is not accepted by the network node.

The network node 30, in accordance with any one of the embodiments illustrated in FIG. 3 and FIG. 11 may further be enhanced with features commented in the following.

In an embodiment of the network node 30, the active PRAs may be selected per at least one of packet data network (PDN) connection basis and IP Connectivity Access Network (IP-CAN) session basis. In particular, the active PRAs may be selected by the processor 320 or by the selector 326. In embodiments of the network node 30, the active PRAs may be selected taking into account any one of a maximum number of PRA-ids supported by the network node 30, and a priority assigned to each PRA-id at the network node 30.

In an embodiment, the network node 30 may further be operable to transmit, towards a target node via the transmitter, the received plurality of applicable PRAs identified by the respective PRA-ids.

In an embodiment, the network node 30 may further be operable to receive the plurality of applicable PRA-ids from the policy controller 20 via one or more further network nodes, and to transmit the one or more indication towards the policy controller 20 via one or more further network nodes. In particular the one or more further network nodes may comprise any one of a PGW 10 and a SGW 11.

The invention may also be practised by a computer program, loadable into an internal memory of a computer with input and output units as well as with a processing unit. This computer program comprises to this end executable code adapted to carry out the above method steps when running in the computer. In particular, the executable code may be recorded in a carrier readable means in a computer.

The invention is described above in connection with various embodiments that are intended to be illustrative and non-restrictive. It is expected that those of ordinary skill in this art may modify these embodiments.

The invention claimed is:

1. A method of handling a plurality of Presence Reporting Areas, PRAs, the method carried out by a policy controller in charge of policy control and/or charging decisions, and the method comprising:
   selecting a plurality of applicable PRAs identified by respective PRA identifiers, PRA-ids;
   transmitting, towards a network node, the plurality of applicable PRA-ids and, for each PRA-id, a priority assigned for a corresponding PRA; and
   receiving, from the network node, at least one of:
      an indication on whether a user equipment, UE, is inside or outside a PRA identified by a PRA-id; and
      an indication on whether a PRA, identified by a PRA-id in the plurality of PRA-ids, is or is not accepted by the network node.

2. The method of claim 1, wherein the applicable PRAs are selected per at least one of packet data network (PDN) connection basis and IP Connectivity Access Network, IP-CAN, session basis.

3. The method of claim 1, wherein transmitting the plurality of applicable PRA-ids comprises transmitting, towards the network node and for each PRA-id, a list of elements composing the corresponding PRA.

4. The method of claim 1, further comprising receiving from the network node or from a further network node an indication on whether multiple PRAs are or are not supported.

5. The method of claim 1, wherein the plurality of applicable PRA-ids is transmitted towards the network node via one or more further network nodes.

6. The method of claim 1, wherein the one or more indications are received from the network node via one or more further network nodes.

7. The method of claim 5, wherein the one or more further network nodes comprise any one of a packet data network gateway, PGW, and a serving gateway, SGW.

8. The method of claim 1, wherein the policy controller is any one of a Policy and Charging Rules Function, PCRF, server and an Online Charging System; and wherein the network node is any one of a Mobility Management Entity, MME, a Serving GPRS Support Node, SGSN, an SGSN supporting a so-called S4 interface, hereinafter S4-SGSN, and a packet data network gateway, PGW.

9. A method of handling a plurality of Presence Reporting Areas, PRAs, the method carried out by a network node in charge of handling mobility of user equipment, UE and the method comprising:
   receiving, from a policy controller, a plurality of applicable PRAs identified by respective PRA identifiers, PRA-ids, and for each PRA-id, a priority assigned for a corresponding PRA;
   selecting, from the plurality of applicable PRA-ids, a number of PRA-ids to be active at the network node; and
   transmitting, towards the policy controller, at least one of:
      an indication on whether a user equipment, UE, is inside or outside a PRA identified by a PRA-id; and
      an indication on whether a PRA, identified by a PRA-id in the plurality of PRA-ids, is or is not accepted to be active by the network node.

10. The method of claim 9, wherein the active PRA-ids are selected per at least one of packet data network (PDN) connection basis and IP Connectivity Access Network, IP-CAN, session basis.

11. The method of claim 9, wherein the active PRA-ids are selected taking into account a maximum number of PRA-ids supported by the network node.

12. The method of claim 9, wherein the active PRA-ids are selected taking into account a priority assigned to each PRA-id at the network node.

13. The method of claim 9, wherein receiving the plurality of applicable PRA-ids comprises receiving, from the policy controller and for each PRA-id, a list of elements composing the corresponding PRA.

14. The method of claim 9, further comprising transmitting towards a target network node the received plurality of applicable PRAs identified by the respective PRA identifiers, PRA-ids.

15. The method of claim 9, wherein the plurality of applicable PRA-ids is received from the policy controller via one or more further network nodes.

16. The method of claim 15, wherein the one or more further network nodes comprise any one of a packet data network gateway, PGW, and a serving gateway, SGW.

17. The method of claim 9, wherein the one or more indications are transmitted towards the policy controller via one or more further network nodes.

18. The method of claim 9, wherein the network node is any one of a Mobility Management Entity, MME, a Serving GPRS Support Node, SGSN, an SGSN supporting a so-called S4 interface, hereinafter S4-SGSN, and a packet data network gateway, PGW; and wherein the policy controller is any one of a Policy and Charging Rules Function, PCRF, server and an Online Charging System.

19. A policy controller in charge of policy control and/or charging decisions, the policy controller configured to handle a plurality of Presence Reporting Areas, PRAs, and comprising:
   at least one processor; and
   at least one memory that stores processor-executable instructions, wherein the at least one processor interfaces with the at least one memory to execute the processor-executable instructions, whereby said policy controller is operable to:
      select, with a processor, a plurality of applicable PRAs identified by respective PRA identifiers, PRA-ids;
      transmit, towards a network node via a transmitter, the plurality of applicable PRA-ids and, for each PRA-id, a priority assigned for a corresponding PRA; and
      receive, from the network node via a receiver, at least one of:
         an indication on whether a user equipment, UE, is inside or outside a PRA identified by a PRA-id; and
         an indication on whether a PRA, identified by a PRA-id in the plurality of PRA-ids, is or is not accepted by the network node.

20. A network node in charge of handling mobility of user equipment, UE, the network node configured to handle a plurality of Presence Reporting Areas, PRAs, and comprising:
   at least one processor; and
   at least one memory that stores processor-executable instructions, wherein the at least one processor interfaces with the at least one memory to execute the processor-executable instructions, whereby said network node is operable to:
      receive, from a policy controller via a receiver, a plurality of applicable PRAs identified by respective PRA identifiers, PRA-ids, and for each PRA-id a priority assigned for a corresponding PRA;

select, with a processor, from the plurality of applicable PRA-ids, a number of PRA-ids to be active at the network node; and transmit, towards the policy controller via a transmitter, at least one of:
- an indication on whether a user equipment, UE, is inside or outside a PRA identified by a PRA-id; and
- an indication on whether a PRA, identified by a PRA-id in the plurality of PRA-ids, is or is not accepted to be active by the network node.

* * * * *